July 28, 1964

F. MUNZEL ETAL 3,142,754

METHOD AND APPARATUS FOR THE IRRADIATION
OF A CONTINUOUSLY ADVANCING MATERIAL
WITH IONIZING RADIATION

Filed Sept. 12, 1960

INVENTORS.
FRITZ MUNZEL.
BY WILLI ROTH.

Ward, Neal, Haselton, Orme & McElhannon
ATTORNEYS.

United States Patent Office 3,142,754
Patented July 28, 1964

3,142,754
METHOD AND APPARATUS FOR THE IRRADIATION OF A CONTINUOUSLY ADVANCING MATERIAL WITH IONIZING RADIATION
Fritz Munzel and Willy Roth, Wattwil, Switzerland, assignors to Heberlein Patent Corporation, New York, N.Y., a corporation of New York
Filed Sept. 12, 1960, Ser. No. 55,582
Claims priority, application Switzerland Sept. 12, 1959
8 Claims. (Cl. 250—52)

This invention relates to irradiation methods and apparatus, and more particularly, to such a method and apparatus for the irradiation of a continuously advancing material web, film, tape, filament or the like, with ionizing radiation.

It has been proposed to subject natural and synthetic textile materials as well as paper and regenerated cellulose or synthetic organic films to the action of ionizing rays, particularly gamma or X-rays, with and without a preliminary treatment with chemical substances, to improve the properties of these materials. While much effort is being expended in the development of various methods and apparatus for accomplishing the irradiation of such material, none of the constructions thus far devised have been entirely satisfactory from a commercial standpoint.

We have conceived a novel method and construction that enables use to irradiate a material web, tape, filament or the like with ionizing radiation while continuously advancing such material. Additionally, our novel method and construction enables us to guide the material to be irradiated in a plurality of passes relative to a source of irradiation, whereby such material receives irradiation during each pass and the irradiation source is utilized to its full advantage, thus minimizing the quantity of such material required and at the same time providing a commercially desirable high volume operation.

In essence, our invention resides in the utilization of a source of radiation having a plurality of surfaces for the transmission of ionizing radiation, and means guiding the advancing material to be irradiated across said surfaces. The member having a plurality of surfaces for the transmission of ionizing radiation is a thin, relatively elongate envelope, which in the preferred embodiment has generally flat surfaces. The means guiding the advancing material are so arranged that the material makes a series of passes adjacent each of the surfaces provided by the tubular member, for the irradiation thereof during each pass.

As a further feature of the invention, the means guiding the advancing material may comprise a series of driven rollers at opposed ends of the radiation source. In its preferred form, a series of idler rollers are also disposed at opposed ends of the tubular member and are arranged in V-shape diverging towards the ends of the tubular member, the driven and idler rollers cooperating to direct the material to be irradiated in superposed passes adjacent each of the surfaces, respectively. Actually, the driven rollers at one end of the tubular member are preferably arranged in V-shape while those at the opposed end are aligned in the central plane of the member.

As an additional feature of the invention, means are provided for moving the radiation source away from the proximity of material threaded through the guide rollers.

Preferably, the tubular member is moved through the apices of one series of idler rollers and the V-shaped series of drive rollers in removing it from the proximity of the material in the passes.

We also provide a massive protective housing within which the radiation source and the means for guiding the advancing material are enclosed. The material to be treated may be guided from a supply exterior of the housing to the irradiation station within the housing and back to a take-up station exterior of the housing. Suitable shields may be disposed at the locations of the entry and exit of said material relative to the housing to absorb stray radiation at these points. Suitable equipment and controls are provided for moving the radiation source to and from its active position relative to the material to be irradiated. In its inactive position the source is disposed in water or other suitable fluid in the ground below the housing.

The housing may also be equipped with viewing windows comprising, for example, spaced transparent panes with a solution of zinc bromide therebetween.

There has thus been outlined rather broadly the more important features of the invention in order that the detailed description thereof which follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A preferred embodiment of the invention has been chosen for purposes of illustration and description, and is shown in the accompanying drawings, forming a part of the specification, wherein.

Figure 1:
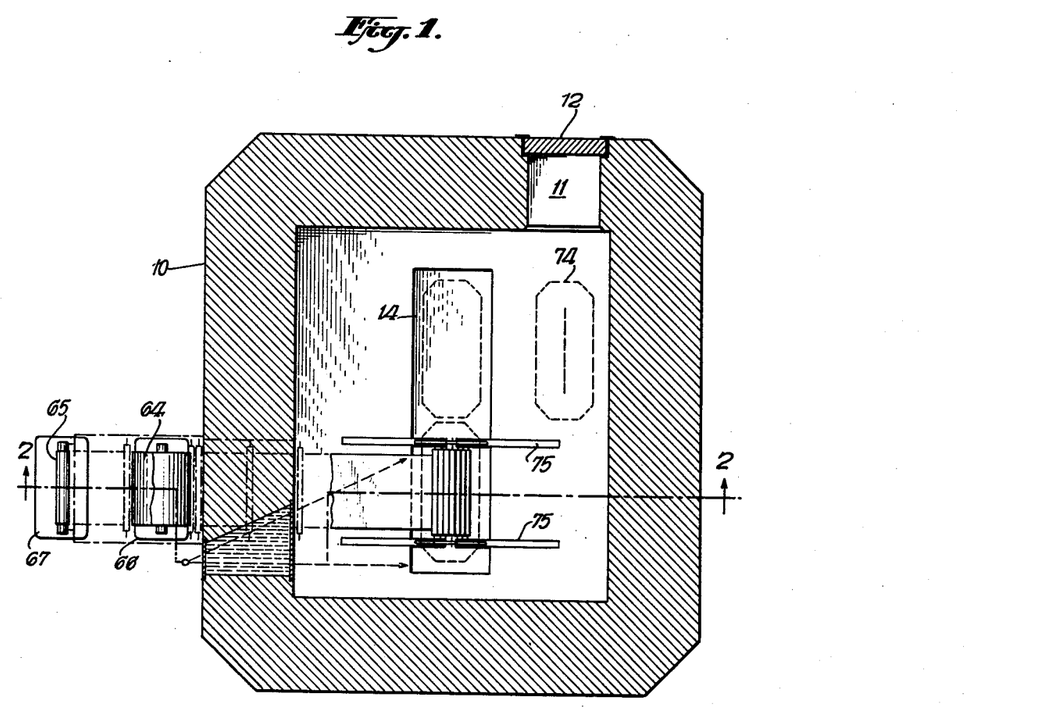
FIG. 1 is a horizontal sectional view of an irradiating apparatus in accordance with the present invention.
Figure 2:
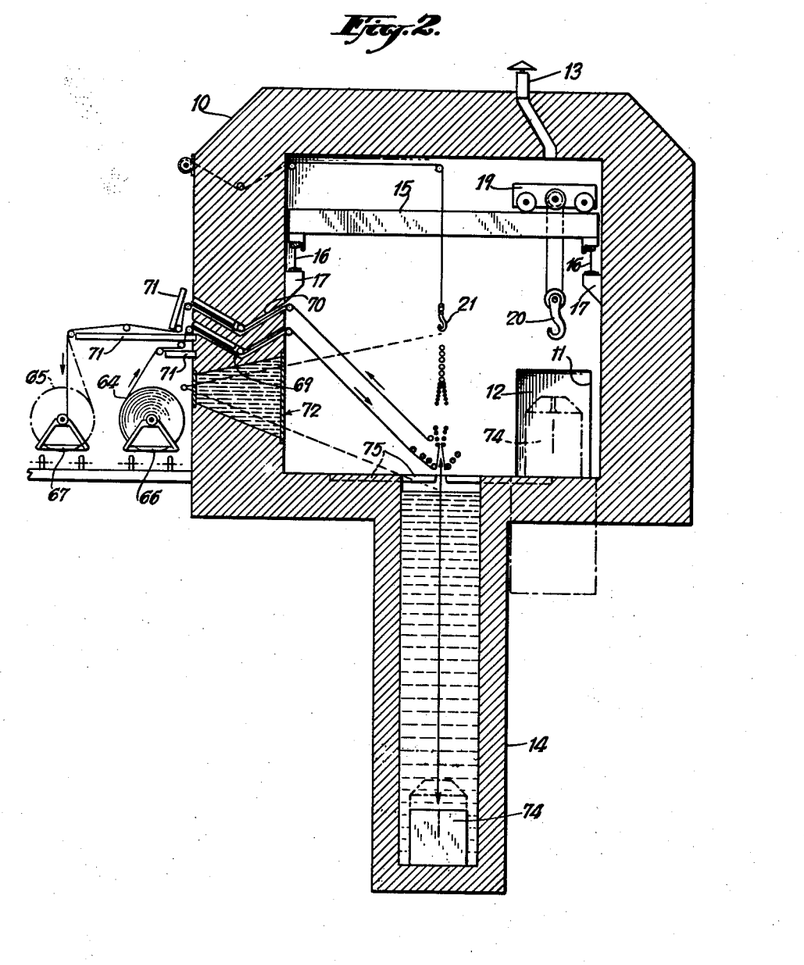
FIG. 2 is a cross-sectional view taken along the line 2—2 of FIG. 1.

Referring now to the drawings, and particularly to FIGS. 1 and 2 thereof, there is shown a massive housing 10 which may be constructed of reinforced concrete, for example, and which has a portal 11 provided with a lead door 12. A shaft 14 depends from the bottom wall or deck of the housing and is maintained filled with water for a purpose to be later described. A suitable vent 13 is provided in the top wall of the housing.

Within the housing 10 an elevated rail 15 is supported in horizontal attitude (FIG. 2) by a pair of spaced beams 16 carried by wall brackets 17. A trolley 19 is movable along the rail 15 under suitable controls (not shown) conveniently located outside the housing 10. The trolley 19 carries a hoisting rig including a hook 20, the purpose of which will also be described hereinafter.

The housing 10 also encloses a second hoisting mechanism including a pair of hooks 21 (FIGS. 2 and 7) which are also controllable exteriorly of the housing. These hooks 21 are utilized for moving a source of ionizing radiation between active and inactive positions. Actually, the radiation source, which is designated generally by the reference numeral 22, is in inactive position when submerged in the water contained in the shaft 14 and is in active position when raised to a position within the housing for effecting irradiation of the material to be treated.

Figures 7, 8, 9, 10:
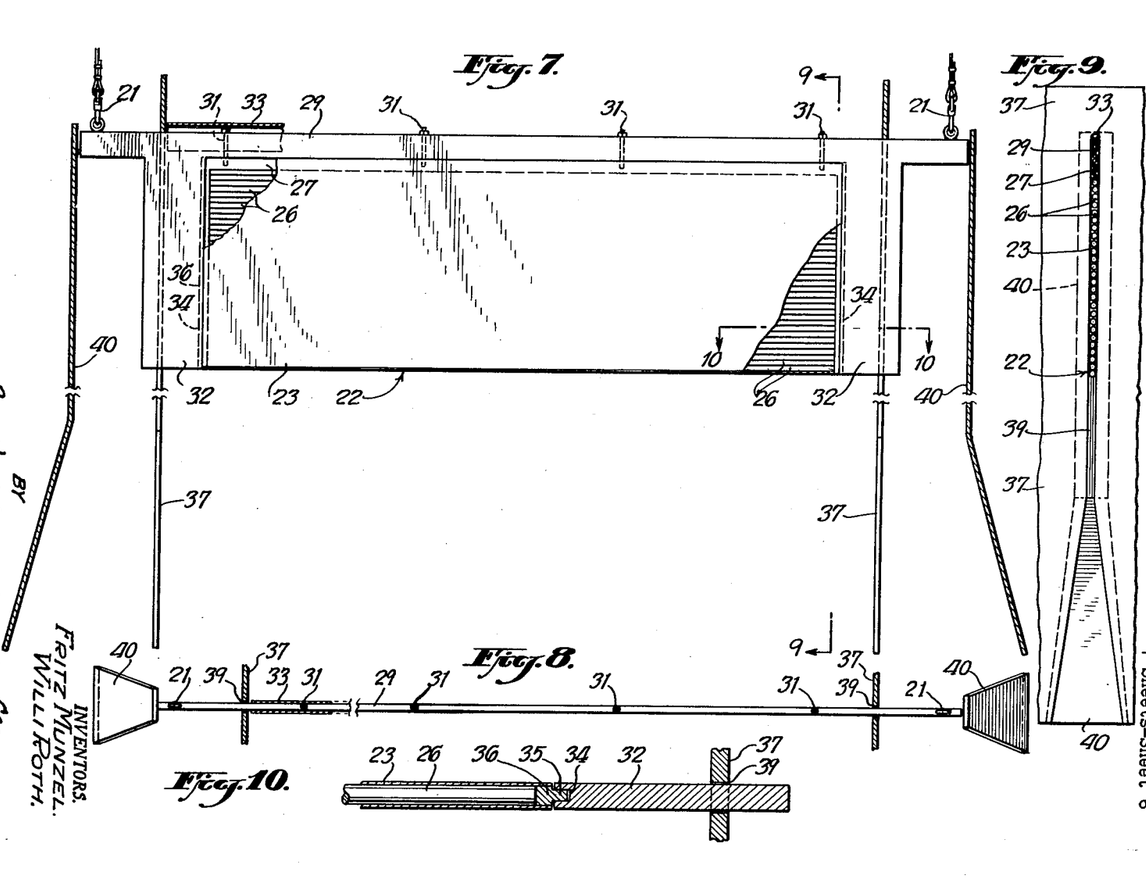
FIG. 7 is a side view, partly broken away, illustrating the preferred form of irradiating source and portions of its supporting structure.
FIG. 8 is a top plan view of the apparatus illustrated in FIG. 7.
FIG. 9 is an end view taken along the line 9—9 of FIG. 7.
FIG. 10 is a cross-sectional view taken along the line 10—10 of FIG. 7.
Figure 11:
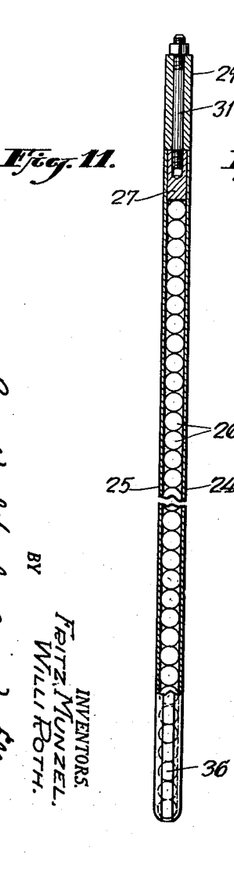
FIG. 11 is a detail end view of the tubular member partially broken away to illustrate certain features thereof.
Figure 12:
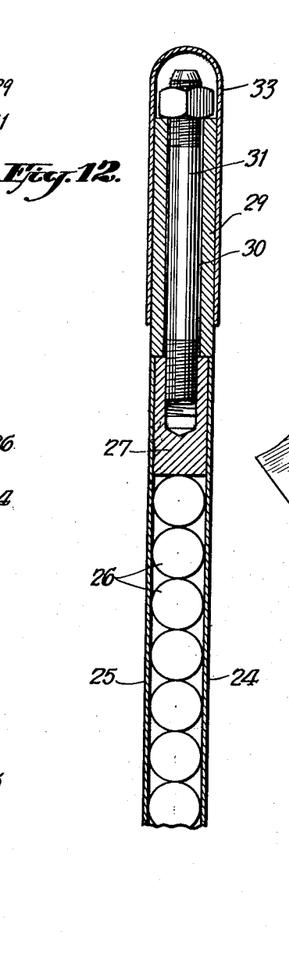
FIG. 12 is a relatively enlarged cross-sectional view of a portion of the structure shown in FIG. 11.

As shown in FIGS. 7, 11 and 12, the source of radiation comprises, in its preferred embodiment, a rather elongate, flat tubular envelope member 23 having a pair of opposed thin, preferably generally flat surfaces 24 and 25 (FIGS. 11 and 12). A suitable radiating material such as cobalt 60, cesium 137 or strontium 90, is disposed within a plurality of hollow containers 26 stacked between the walls 24 and 25.

The upper end of the tubular envelope 23 is closed by an elongate plug 27 and a carrier 29 overlies the plug and is bored at intervals as at 30 (FIG. 12) for the reception of bolts 31 which are tapped into the plug 27 to join the tubular envelope member 23 to its carrier. Bolts 31 are covered as at 33 (FIG. 12) to prevent snagging of the material being irradiated. The carrier has opposed depending wings 32 which are recessed as at 34 (FIGS. 7 and 10) for the reception of projecting tongues 35 on end closure pieces 36 (FIGS. 10 and 11) of the tubular envelope.

The hooks 21 already referred to engage suitable eyes on the carrier 29 as shown in FIG. 7 for elevating and lowering the envelope containing radioactive material between active and inactive positions, respectively.

In order to guide the envelope 23 into its precise active or elevated position, a pair of lead guide plates 37 are slotted as at 39 (FIGS. 8, 9 and 10) and positioned for reception in those slots of the depending wings 32 of the carrier 29, as it is raised into active position. It will be seen that the lower portions of the slots 39 diverge downwardly so that the carrier is gently cammed into its precise position during elevation.

Lateral guides are provided in the form of lead end plates 40 (FIGS. 7 and 8) positioned adjacent the ends of the carrier 29. The lower portions of the plates 40 may also diverge downwardly to guide the carrier into proper endwise position as it is elevated. The guide plates 37 and end plates 40 may conveniently be affixed to angle members 41 (FIGS. 4 and 5), with the latter plates being so affixed by means of mounting members 42 (FIG. 5).

Figure 3:
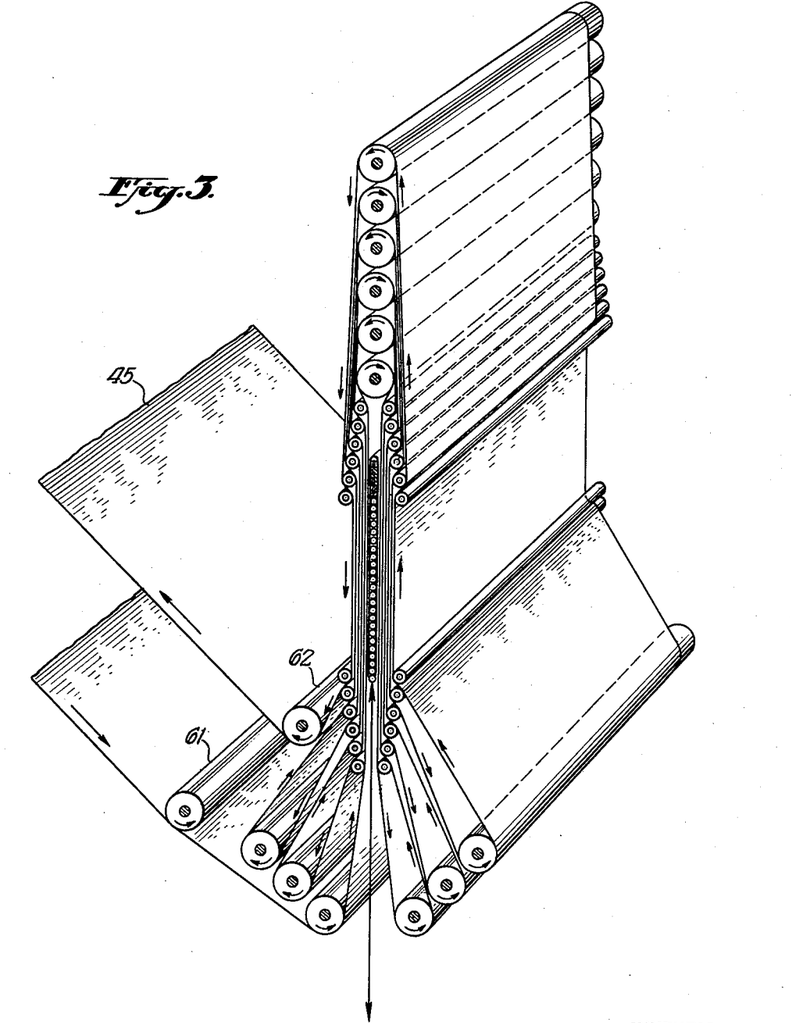
FIG. 3 is a perspective view illustrating details of the guide means with a web of material threaded therethrough and with a source of radiation in active position.
Figures 4, 5:
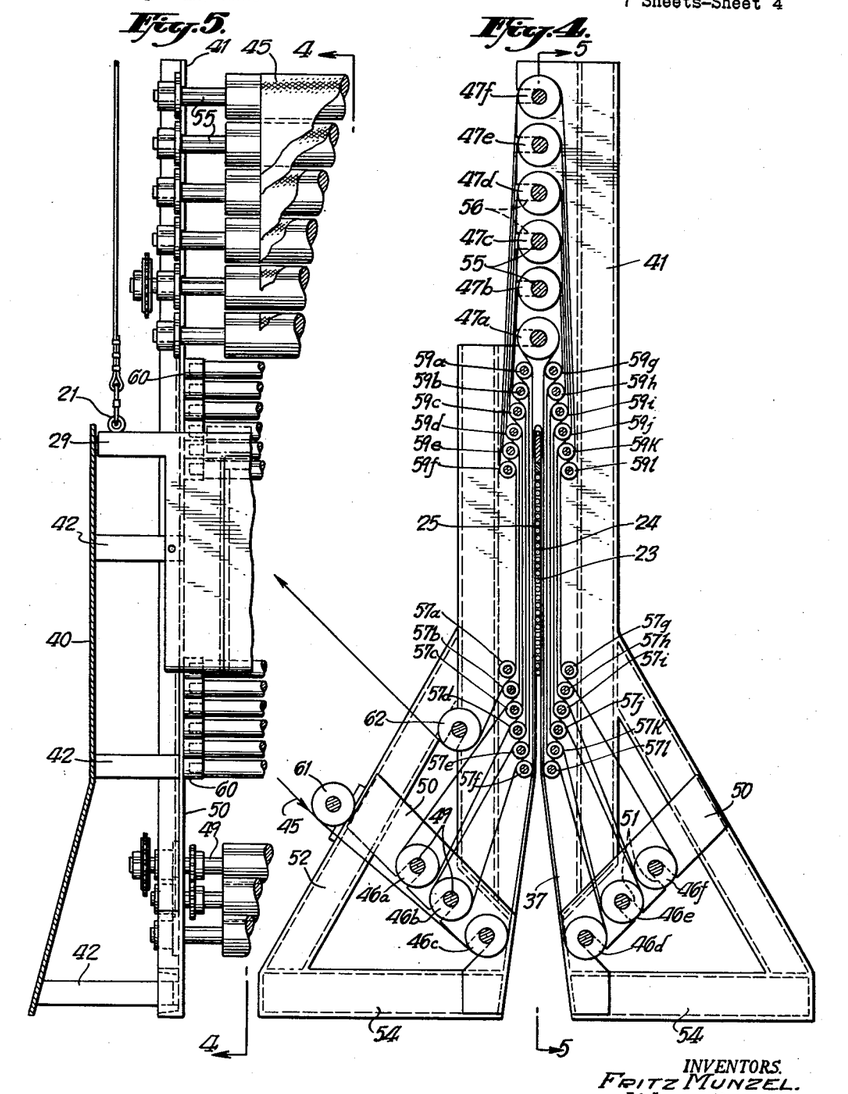
FIG. 4 is a side elevational view taken along the line 4—4 of FIG. 5.
FIG. 5 is a fragmentary cross-sectional view taken along the line 5—5 of FIG. 4.

Referring now to FIGS. 3 to 5, the means guiding the material to be irradiated relatively to the tubular envelope, when the latter is in active position, will now be described. For the purposes of this description it will be assumed that the material to be irradiated is a fabric web 45.

As has already been stated the means guiding the advancing fabric is so arranged that it makes a series of passes across the envelope surfaces. In the preferred form of the invention, such means comprise a first series of driven rollers 46a–f at one end of the tubular envelope 23 and arranged in V-shape diverging towards the envelope, and a second series of driven rollers 47a–f aligned in the central vertical plane of the envelope.

As shown in FIGS. 4 and 5, the rollers 46a–f have central axles or spindles 49 conveniently journaled at their ends in angular bracket members 50 suitably slotted as at 51 for the purpose, and supported along with angle members 41 by frame members 52, 54. The rollers 47a–f have central axles 55 conveniently journaled in the upper portions of angle members 41, which are also slotted as at 56 for the purpose.

Additionally, the material guide means include a series of idler rollers 57a–l arranged in V-shape adjacent the lower end of the envelope member 23; and a series of similar rollers 59a–l arranged in inverted V-shape adjacent the upper end of the envelope. These idler rollers are conveniently journaled at their ends on brackets 60 carried by angle members 41, as shown in FIG. 5.

From the description thus far it will be seen that the envelope 23, when in its active position is disposed with its upper end adjacent the idler rollers 59 and with its lower end adjacent the rollers 57, but that it may be lowered through the apices of the V-shaped series of idler rollers 57 and the V-shaped series of driven rollers 46 to its inactive position in the shaft 14 (FIG. 2).

As shown in FIGS. 3 and 4, for example, the web is first contacted by a guide roll 61 and is then threaded through the driven and idler rollers as follows: first, beneath the roller 46c, thence upwardly against the inside of idler roller 57f, past flat surface 25 of the envelope 23, between rollers 59a and 47a, over roller 47a and downwardly past flat surface 24 of member 23, against the inside of roller 57l, under roller 46d and upwardly between idler rollers 57l and k, upwardly past the side 24 exteriorly of the previous pass, between the rollers 59g and h and over the roller 47b, thence downwardly between idler rollers 59a and b, downwardly past surface 25, between idlers 57e and f and under roller 46b, thence upwardly between idlers 57d and e, again past surface 25, between idlers 59b and c, and over 47c; and so forth until after the twelfth pass, between the idler rollers 57a and b and the guide roll 62. While the illustrated embodiment of the invention demonstrates twelve passes, it will be appreciated that more or less passes may readily be arranged, as desired.

Reverting to FIGS. 1 and 2, the supply 64 and take-up 65 may be located outside and at the same side of the housing 10, and may constitute supply and take-up shafts cradled in supporting brackets 66, 67 respectively. As shown in FIG. 2, the web passes through V-shaped passages 69, 70 in the wall of the housing suitable guide rolls being positioned at each point where the direction of movement of the web is changed. Lead shields 71, serving as radiation barriers are strategically located adjacent the outer openings of the passages 69 and 70. A sight opening 72 is provided in a wall of the housing and may consist of a pair of spaced transparent panes with a solution of zinc bromide or the like therebetween.

When setting up the apparatus, the envelope 23 containing the radiating material is enclosed in a lead container 74 and both are lowered in the shaft 14 by means of the hook 20 and its associated hoisting rig. The container 74 is then removed from the shaft and deposited aside, the envelope 23 is secured to the carrier 29, and the angle members carrying the series of rollers 26, 47, 57 and 59 and the guide rolls 61 and 62 are positioned over the shaft 14 in recesses 75 provided in the deck of the housing 10. The fabric web 45, tape, filament or the like is then led into the housing from its supply and is threaded through the guide means as described, and then back to the take-up station. Finally the carrier 29 with the envelope 23 affixed to it is raised by the hooks 21 until it reaches active position after which the web is advanced continuously in the direction indicated by the arrows in FIGS. 3 and 4.

Figure 6:
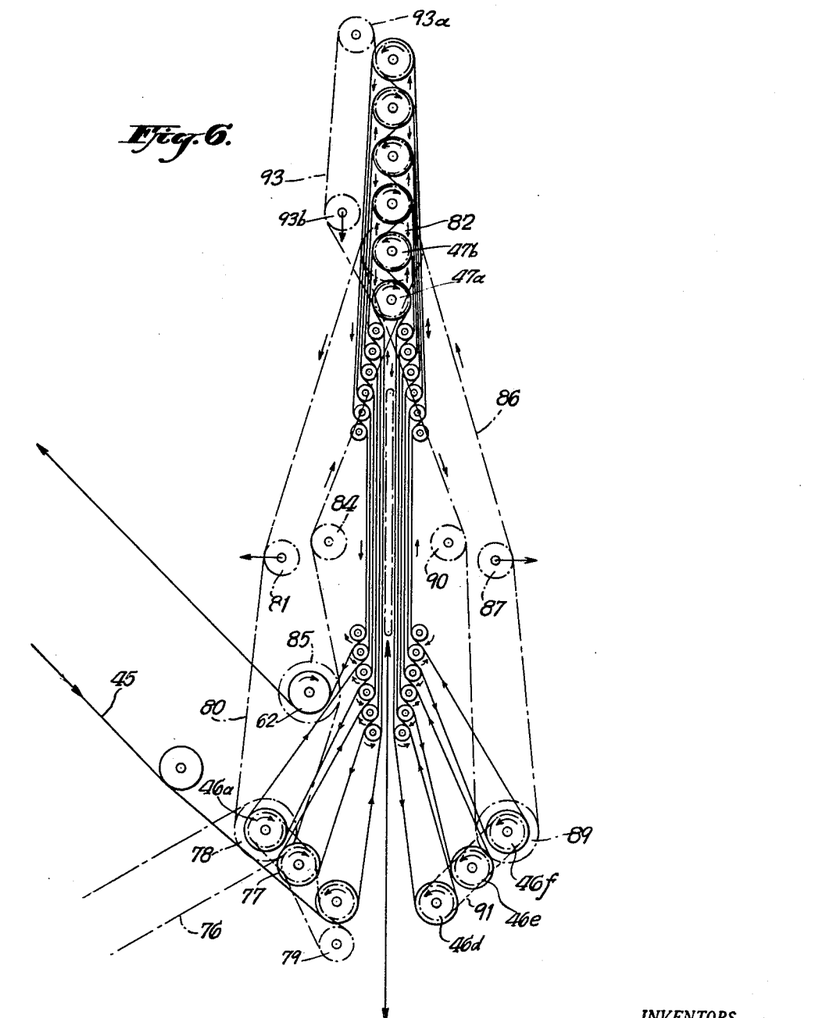
FIG. 6 is a diagrammatic view illustrating the guide means for the material to be irradiated and the drive means for the driven rollers thereof.

Referring to FIG. 6 there is illustrated the means by which the rollers 47 and 49 are driven. Thus, an endless belt or chain 76 from a power source (not shown) drives the roller 46a in the direction indicated by the arrow thereon by means of a sheave 78. A second belt 77 is reeved about grooved wheels and guide pulley 79 associated with the rollers 46a, b and c to drive them in the directions indicated. A third belt 80 also takes from the roller 46a, passes over tensioning wheel 81, which is biased as indicated, over a sheave 82, guide wheel 84 and sheave 85 associated with guide roll 62, and back to sheave 78. Still a further belt or chain 86 takes power from sheave 82, passes over tensioning wheel 87 biased as indicated, and drives sheave 89 associated with roller 46f, thence returning over guide wheel 90 to the sheave 82. A belt or chain 91 takes power from the sheave 89 and drives the rollers 46e and d in the directions indicated. A final belt or chain 93 is reeved about grooved wheels associated with the rollers 47a–f to effect rotation thereof in the directions indicated by the arrows shown in FIG. 6, over a guide wheel 93a and a tensioning wheel 93b, biased as shown, and back roller 47a. This belt or chain of course takes its power from the roller 47b which is driven by the sheave 82, as already described.

Figure 13:
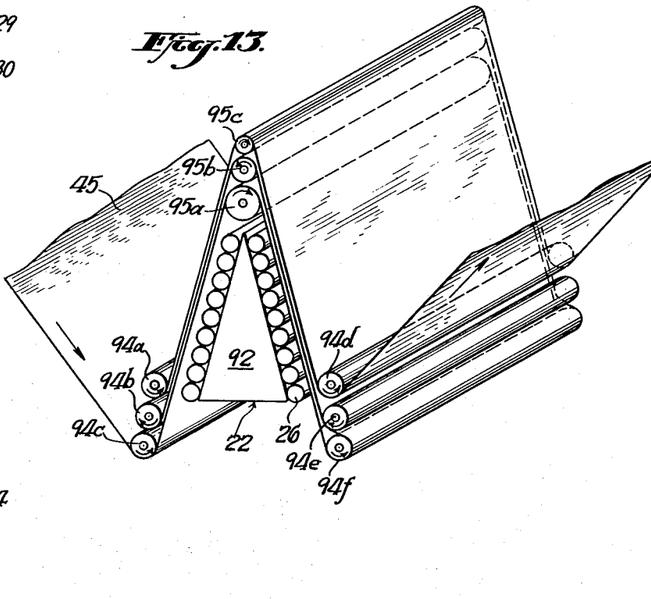
FIG. 13 is a perspective view illustrating an additional embodiment of the material guide means and the irradiating member.

In FIG. 13, there is shown a modification of the invention wherein the irradiating means comprises an elongate member 92 having the contour of an isosceles triangle in transverse cross-section with a series of containers 26 of irradiating material stacked adjacent the equal sides thereof. Two groups of driven rollers 94a to c and 94d to f, respectively, are positioned parallel to the longitudinal axis of the member 92 adjacent its lower end and these are driven as indicated by the respective arrows thereon. An additional group of rollers 95a to c are aligned above the apex of the member 92 and are of progressively reduced diameter in a direction away from the member. The web 45 is threaded under the roller 94c and along a pass adjacent one series of containers 26, thence over roller 95a and down along a second pass adjacent the second series of container 26, around roller 94f and between it and roller 94c, up along a third pass adjacent the second series of containers 26, over roller 95b and down a fourth pass adjacent the first series of containers, under roller 94b, between it and roller 94a, up for a fifth pass adjacent the first series of containers, over roller 95c, down for a sixth pass adjacent the second series of rollers, under the roller 94d and to a take-up (not shown). While sufficient rollers are shown to permit six passes, it will be appreciated that any desired number of passes may be arranged.

From the foregoing description it will be seen that we contribute a novel method and construction that enables us to irradiate a material web, filament, tape or the like with ionizing radiation while continuously advancing the material in a plurality of passes relative to a source of such radiation. The term "material" as employed in the appended claims shall be understood to include a fabric or film web, a tape, a filament or the like.

We claim:

1. Apparatus for the irradiation of a length of material with ionizing radiation, comprising an elongate member having a pair of generally flat opposed surfaces enclosing a source of ionizing radiation emitting ionizing radiation at said surfaces, roller means advancing the material to be irradiated and means guiding the advancing material next adjacent each of said surfaces for irradiation thereof by said source.

2. Apparatus for the irradiation of a length of continuously advancing material with ionizing radiation, comprising an elongate tubular envelope having a pair of generally flat opposed surfaces and enclosing a source of ionizing radiation, a series of driven rollers at opposed ends of said tubular envelope and a series of idler rollers at opposed ends of said tubular envelope, said driven and idler rollers cooperating to direct the material to be irradiated in superposed passes adjacent each of said surfaces, respectively, and means for moving said tubular envelope from the proximity of the material in said passes.

3. Apparatus for the irradiation a continuously advancing length of material with ionizing radiation, comprising an elongate flat tubular member having a pair of opposed surfaces and containing a source of ionizing radiation, a series of driven rollers arranged in V-shaped and spaced from one end of said tubular member, a series of driven rollers adjacent the opposed end of said tubular member and aligned in the central plan of said member, and a series of idler rollers adjacent said opposed ends of said tubular member and arranged in V-shape diverging towards said ends of said tubular member, said driven and idler rollers cooperating to guide the material to be irradiated in superposed passes adjacent each of said surfaces, respectively.

4. Apparatus for the irradiation of a length of material with ionizing radiation, comprising an elongate tubular envelope having a pair of opposed surfaces and containing a source of ionizing radiation, roller means advancing the material to be irradiated, means guiding the advancing material in passes across said surfaces, and means for moving said tubular envelope from the proximity of the material in said passes.

5. Apparatus for the irradiation of a continously advancing length of material with ionizing radiation, comprising an envelope member having a plurality of surfaces and containing a source of ionizing radiation, a series of driven rollers arranged in V-shaped and spaced from one end of said envelope, a series of driven rollers adjacent the opposed end of said envelope and aligned in the central plane of said envelope and a series of idler rollers adjacent each of said ends of said envelope and arranged in V-shaped drivering towards said ends of said envelope, said driven and idler rollers cooperating to direct the material to be irradiated in superposed passes adjacent each of said surfaces, respectively, and means for moving said envelope through the apices of one series of idler rollers and said V-shaped series of driven rollers and thus away from the proximity of the material in said passes.

6. Apparatus for the irradiation of a length of material with ionizing radiation, comprising a massive housing, an elongate envelope within said housing having a plurality of generally planar surfaces and containing a source of ionizing radiation, roller means advancing the material to be irradiated, means guiding the advancing material from a supply exterior of said housing, across said surfaces and to a take-up station exterior of said housing, and radiation shields at the locations of entry and exit of said material in said housing.

7. Apparatus for the irradiation of a continuously advancing length of material with ionizing radiation, comprising a massive housing, a tubular member within said housing having a pair of generally flat opposed surfaces and containing individual segregated charges of radiation source material, a supply and take-up for material to be irradiated positioned exterior of said housing, guide means within said housing comprising a series of driven rollers at opposed ends of said tubular member and a series of idler rollers at opposed ends of said tubular member and arranged in V-shape diverging towards the ends of said tubular member, entrance and exit means in said housing through which said material enters said housing from said supply and returns from said housing to said take-up, said driven and idler rollers cooperating to guide the material to be irradiated in superposed passes adjacent each of said respective surfaces of said tubular member within said housing, and means for moving said tubular member from the proximity of the material within said passes and into a radiation resistant zone.

8. Apparatus for the irradiation of a length of material with ionizing radiation, comprising a member, presenting a plurality of generally planar surfaces, supporting ionizing radiation source means, said source means emitting ionizing radiation at said surfaces, roller means advancing the material to be irradiated and means guiding the advancing material next adjacent at least two of said surfaces for irradiation thereof by said source means.

References Cited in the file of this patent

UNITED STATES PATENTS

| | | |
|---|---|---|
| 2,597,535 | Segre | May 20, 1952 |
| 2,751,505 | Anderson | June 19, 1956 |
| 2,858,442 | Dewey | Oct. 28, 1958 |
| 2,914,450 | Hammesfahr | Nov. 24, 1959 |
| 2,968,734 | Yeomans | Jan. 17, 1961 |

UNITED STATES PATENT OFFICE
CERTIFICATE OF CORRECTION

Patent No. 3,142,754

July 28, 1964

Fritz Munzel et al.

It is hereby certified that error appears in the above numbered patent requiring correction and that the said Letters Patent should read as corrected below.

Column 1, line 28, for "use" read -- us --; column 5, line 15, after "takes" insert -- power --; line 29, after "back" insert -- to --; line 47, for "container" read -- containers --; column 6, lines 37 and 42, for "V-shaped", each occurrence, read -- V-shape --; same column 6, line 42, for "drivering" read -- diverging --.

Signed and sealed this 12th day of January 1965.

(SEAL)
Attest:

ERNEST W. SWIDER
Attesting Officer

EDWARD J. BRENNER
Commissioner of Patents